US012720253B2

(12) United States Patent
Shennib

(10) Patent No.: US 12,720,253 B2
(45) Date of Patent: Aug. 25, 2026

(54) FRONT OF THE EAR HEARING DEVICE WITH BIOSENSORS

(71) Applicant: Adnan Shennib, Oakland, CA (US)

(72) Inventor: Adnan Shennib, Oakland, CA (US)

( * ) Notice: Subject to any disclaimer, the term of this patent is extended or adjusted under 35 U.S.C. 154(b) by 195 days.

(21) Appl. No.: 18/667,888

(22) Filed: May 17, 2024

(65) Prior Publication Data

US 2024/0397251 A1 Nov. 28, 2024

Related U.S. Application Data

(60) Provisional application No. 63/468,305, filed on May 23, 2023.

(51) Int. Cl.

| | |
|---|---|
| ***H04R 1/10*** | (2006.01) |
| ***H04R 1/08*** | (2006.01) |
| ***H04R 3/00*** | (2006.01) |

(52) U.S. Cl.

CPC ........... *H04R 1/1091* (2013.01); *H04R 1/083* (2013.01); *H04R 1/1016* (2013.01); *H04R 1/1041* (2013.01); *H04R 1/105* (2013.01); *H04R 3/00* (2013.01); *H04R 2420/07* (2013.01)

(58) Field of Classification Search

CPC .... H04R 1/1091; H04R 1/083; H04R 1/1016; H04R 1/1041; H04R 2225/021; H04R 2225/025; H04R 1/105

USPC ......................................... 381/312, 322, 330

See application file for complete search history.

(56) References Cited

U.S. PATENT DOCUMENTS

| | | | |
|---|---|---|---|
| 6,283,915 | B1 | 9/2001 | Aceti et al. |
| 8,157,730 | B2 | 4/2012 | Leboeuf et al. |
| 9,769,577 | B2 | 9/2017 | Shennib |
| 10,015,582 | B2 | 7/2018 | Wagner et al. |
| 10,057,675 | B2 | 8/2018 | Mankodi et al. |

(Continued)

FOREIGN PATENT DOCUMENTS

EP 2441238 B1 * 3/2016 .............. H04M 1/05

OTHER PUBLICATIONS

Kuk F.; Slugocki C.; Korhonen P.; Peeters H. Forms Influence Functions: Microphone Angle and Speech-in-Noise Performance. Hearing Review. 2024;31(3): 14-19.

(Continued)

*Primary Examiner* — George C Monikang

(74) *Attorney, Agent, or Firm* — PATENT PORTFOLIO BUILDERS PLLC

(57) ABSTRACT

The present disclosure describes examples of hearing device, systems and methods of enhancing the hearing ability, while providing reliable biosensing of vital signs non-invasively. The front of the ear hearing device comprises a main module with sensors located along the path of superficial temporal artery. A speaker section medially positioned into the ear cavity combined with a posterior section over the ear secure the hearing device to the ear. A front microphone and rear microphone are aligned in the horizontal direction to provide highly directional sound pick up. The hearing device may be communicatively coupled to a smartphone for telephony, audio streaming, and for selecting the directionality for sound pickup. Applications include hearing enhancement, voice detection, voice authentication, text-to-audio speaker isolation, audio recording, language translation, and acoustic scene detection.

20 Claims, 10 Drawing Sheets

(56) References Cited

U.S. PATENT DOCUMENTS

| | | | | |
|---|---|---|---|---|
| 11,344,256 | B2 | 5/2022 | Kirszenblat et al. | |
| 11,523,202 | B2 | 12/2022 | Au et al. | |
| 11,889,265 | B2 | 1/2024 | Pedersen et al. | |
| 11,998,354 | B2 | 6/2024 | Petersen et al. | |
| 2005/0177034 | A1 | 8/2005 | Beaumont | |
| 2015/0270734 | A1* | 9/2015 | Davison | H02J 7/342 320/103 |
| 2017/0180879 | A1* | 6/2017 | Petersen | H04R 25/453 |
| 2019/0082276 | A1* | 3/2019 | Crow | H04R 25/505 |

OTHER PUBLICATIONS

Bray & Nilsson, Additive SNR Benefits of Signal Processing Features in a Directional DSP Aid, The Hearing Review, Dec. 5, 2001, 8(12), pp. 48-51.

Palladino, Hear the pulse: Heart rate monitoring fitness earbuds tested, Ars Technica, Dec. 4, 2016.

* cited by examiner

FRONT OF THE EAR HEARING DEVICE WITH BIOSENSORS

CROSS-REFERENCE TO RELATED APPLICATIONS

This application claims the benefit under 35 U.S.C. § 119 of the earlier filing date of U.S. Provisional Application No. 63/468,305 entitled "FRONT OF THE EAR HEARING DEVICE WITH BIOSENSORS PROXIMAL TO SUPERFICIAL TEMPORAL ARTERY," filed May 23, 2023.

This application is related to concurrently filed utility non-provisional patent application titled "EYEGLASS HEARING DEVICE WITH BIOSENSORS", filed May 17, 2024.

The aforementioned applications are incorporated herein by reference in their entirety, for any purpose.

TECHNICAL FIELD

Examples described herein relate to listening devices, more particularly hearing devices with high directionality and incorporating vital sign and activity sensing. For the purpose of this application, a hearing device refers to any device for listening purposes including a hearing aid, an earphone, earbud, hearables, etc. for delivering sound or audible vibrations in or around the ear.

BACKGROUND

Wearables including hearing aids, personal sound amplifiers, hearables, earbuds, etc. are increasingly incorporating biosensors for sensing vital signs and activity. Prior art hearing device configurations such as Behind-The-Ear (BTE), Receiver-In-Canal (RIC), In-The-Ear (ITE), In-The-Canal (ITC), earbud. Completely-In-Canal (CIC), etc., rely on placement of electronics in or behind the ear as shown in FIGS. 1-3. The utilization of biosensors within these hearing devices, and wearables in general, provides information about health, fitness, and safety. However, placement of sensors in prior art hearing devices provides unreliable sensing of biological signals due to lack of adequate vascular tissues in the vicinity of the incorporated sensor.

Placement of a receiver 12 in the ear cavity 22 is generally desirable for electroacoustic advantages including reduced feedback, lower power consumption, longer battery operation, reduced distortion, and improved high frequency response. To achieve these desirable effects, a speaker of a hearing device is preferably inserted in the ear cavity, at least into the concha cavity, for direct and efficient sound delivery to the eardrum.

Incorporating two microphones in prior art hearing device configurations, as shown in FIGS. 2 and 3, provides limited improvement in directionality due to the misalignment of a front microphone 11 (FIG. 2) and a rear microphone 12, generally pointing in an upward direction 13 with a strong vertical component 14, while a person wearing the hearing device generally seeks directionality in a horizontal direction 15 (towards the front of the head). In the example of the RIC device 10 configuration show in FIG. 2, the improvement in signal to noise ratio (S/N) is generally limited to about 3 decibels, mainly due to the misalignment of microphones, but also due to the relatively short distance between the two microphones, generally less than 3 cm apart. Similarly, in the popular earbud 17 configuration shown in FIG. 3, the two microphones 18 and 19 are generally aligned with a large vertical component 14, limiting the directionality in the horizontal component 15. A major goal of the present disclosure is improving the directionality in the horizontal direction for improving speech perception in noisy environments. Another goal is to provide more reliable biosensing of vital signs.

Anatomy of the Temple and Condyle Areas of the Head

The superficial temporal artery 28 runs vertically anterior (front) with respect to the external ear 20. The region above mandibular condyle 27 is highly vascular underneath the skin, mainly due to the presence of the superficial temporal artery 28 and its branches 29, as well as the superficial temporal vein (not shown) adjacent to the temporal artery 28. Vital signs such as heart rate, blood pressure, oxygen saturation level, temperature, etc. can be obtained non-invasively by placing biosensors generally at the temple 26 or condyle 27 areas, along the path of superficial temporal artery. Placement of biosensors within a hearing device is generally known in the art but limited to placement on traditional hearing aids, away from the superficial temporal artery 28. For example, commercially available earbud may provide heart rate sensing through photoplethysmography (PPG) with limited accuracy due to the low blood flow in the tissue surrounding these devices, and due to the instability of the devices and motion artifacts during activity. The present disclosure describes examples of a new hearing device configuration and methods which address the aforementioned shortcomings.

SUMMARY

A hearing device for enhancing the hearing ability, particularly in noisy conditions, while providing reliable non-invasive sensing of vital signs, comprising a main module incorporating a front microphone and a main module comprising sensors positioned in front of the ear along the path of the superficial temporal artery for detecting vital signs, such as any one or more of heart rate, oxygen saturation level, glucose level, blood pressure, respiration rate and temperature. A speaker may be provided directly in the ear cavity for efficient sound delivery while significantly reducing feedback in hearing aid applications. A rear microphone provided in an extension over the ear, section enabling high directionality for enhancing speech recognition in noisy environments.

In a preferred embodiment, the hearing device is wirelessly coupled to a smartphone for telephony, audio streaming, and for selecting the directionality of sound pickup. Multiple processors may be employed for dedicated tasks such as biosensing, audio processing, AI and voice recognition. The hearing device may be configured as a digital assistant. Applications may include hearing aid, voice detection, voice authentication, speaker isolation, audio recording, language translation, acoustic scene detection for automatic adjustment of hearing enhancement parameters, health monitoring, vital sign detection, deep noise cancellation, text-to-audio conversion, speech recognition, and stress monitoring. A camera and vibration sensor may be incorporated.

BRIEF DESCRIPTION OF THE DRAWINGS

The above and still further objectives, features, aspects and attendant advantages of the present invention will become apparent from the following detailed description of certain preferred and alternate embodiments and method of manufacture and use thereof constituting the best mode presently contemplated of practicing the invention, when taken in conjunction with the accompanying drawings, in which.

DETAILED DESCRIPTION

Figure 1:
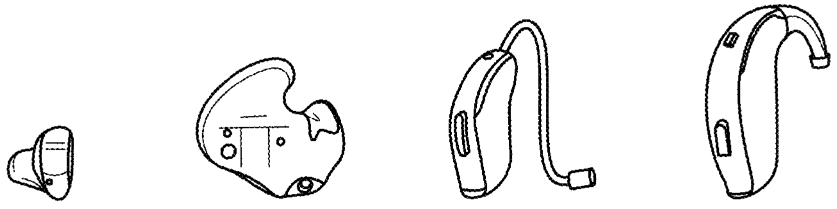
FIG. 1 is a view of prior art hearing devices which generally fit in or behind the ear of a user.
Figure 2:
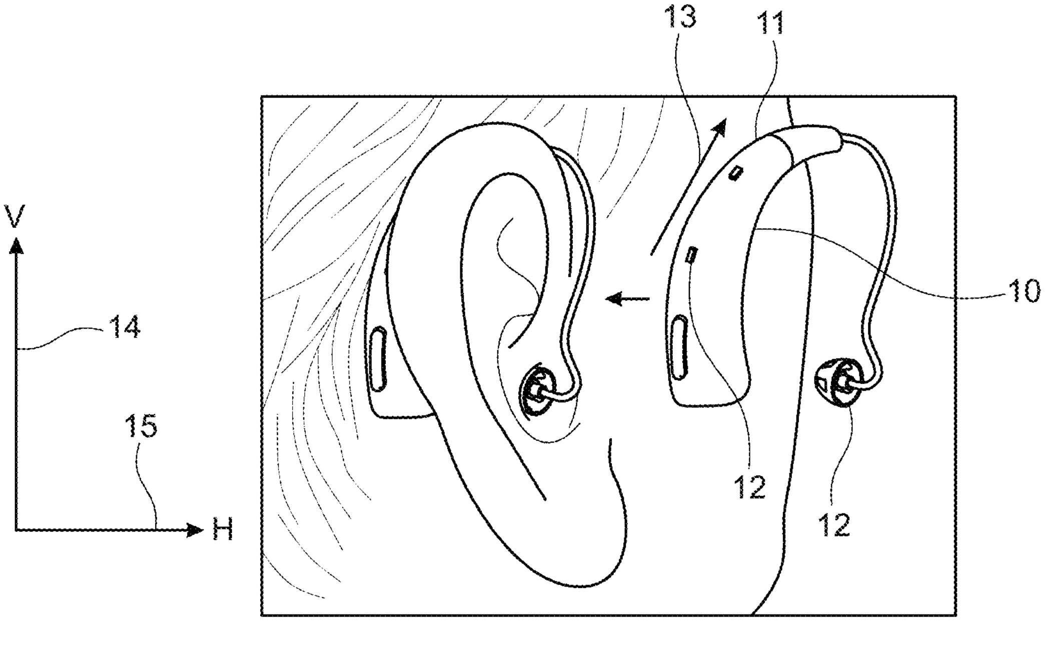
FIG. 2 is a view of prior art Receiver-In-Canal (RIC) hearing device showing placement of the main electronics behind and over the ear, and two microphones generally aligned vertically.
Figure 3:
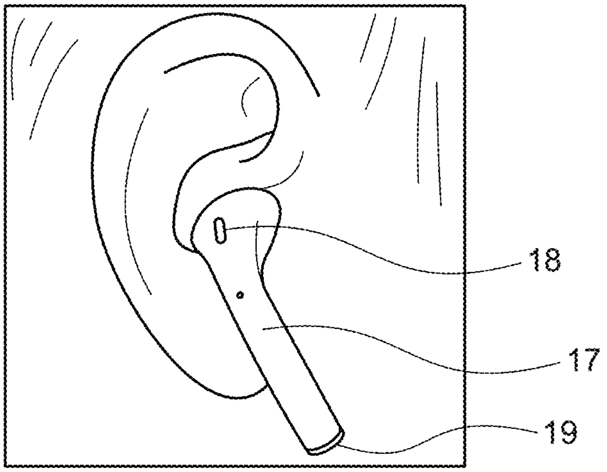
FIG. 3 is a view of a prior art earbud device with two microphones generally aligned along the vertical axis.
Figure 4:
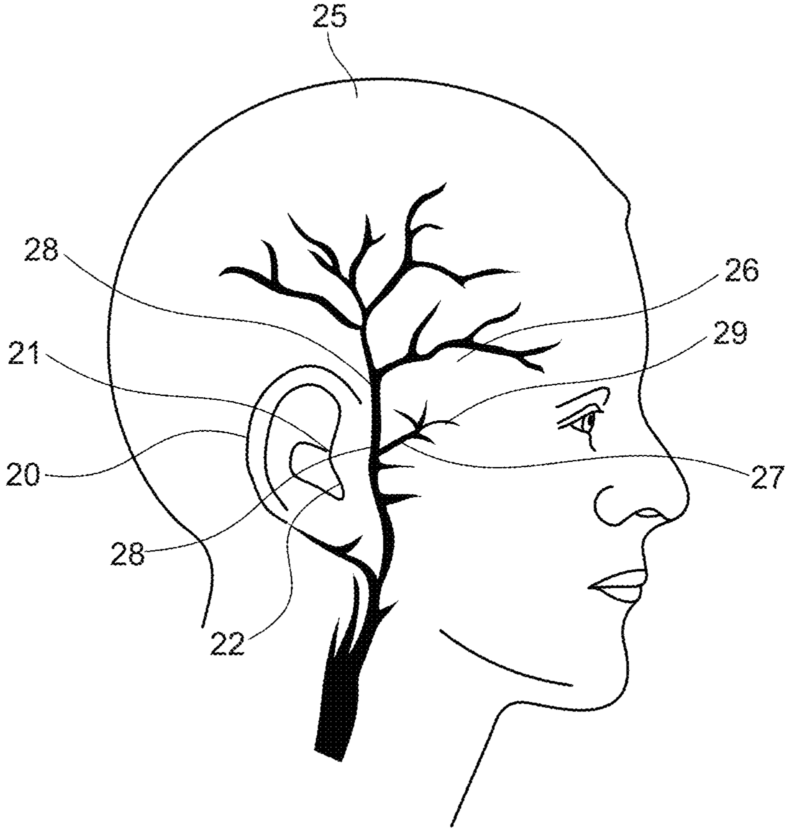
FIG. 4 is an anatomical view of the superficial temporal artery with respect to the ear.
Figure 5:
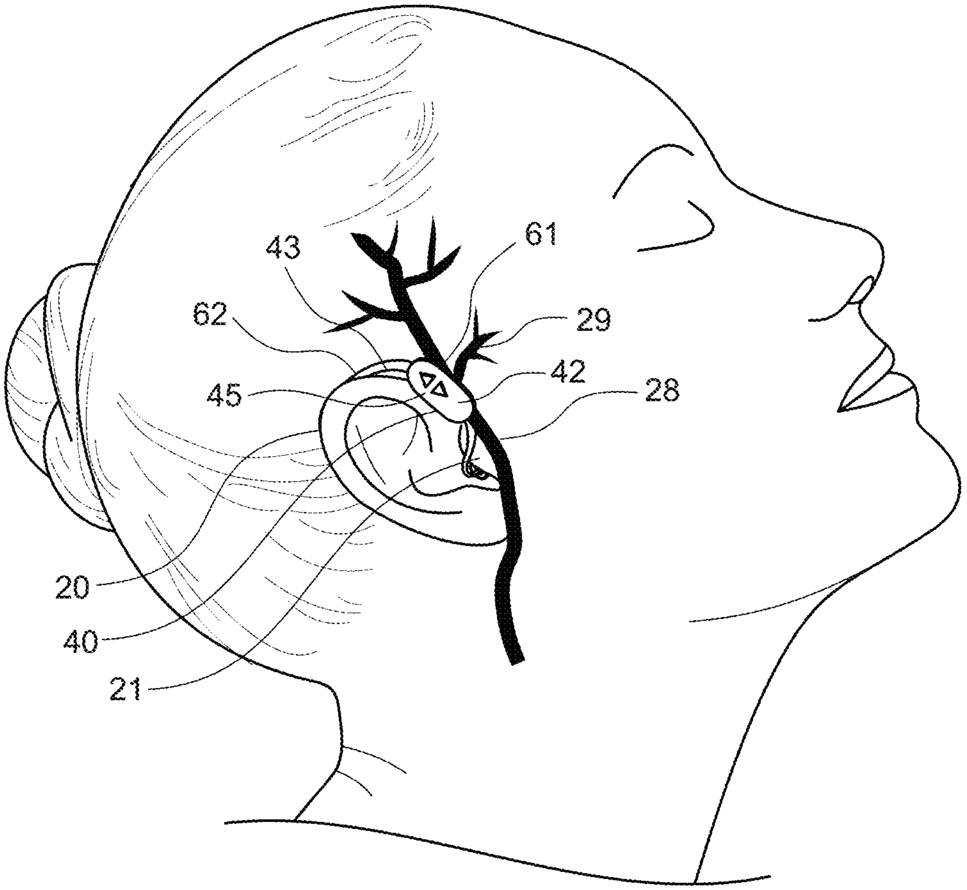
FIG. 5 is a view of the front of the ear hearing device showing placement of the main module with sensors in front of the ear along the path of the superficial temporal artery, and speaker for placement into the ear, according to some examples.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

All publications mentioned herein are incorporated herein by reference to disclose and describe the methods and/or materials in connection with which the publications are cited. It is understood that the present disclosure supersedes any disclosure of an incorporated publication to the extent there is a contradiction.

It must be noted that as used herein and in the appended claims, the singular forms "a", "an", and "the" include plural referents unless the context clearly dictates otherwise.

Certain details are set forth below to provide a sufficient understanding of embodiments of the invention. However, it will be appreciated by one skilled in the art that some embodiments may not include all details described. In some instances, well-known structures, hearing aid components, circuits, and controls, have not been shown in order to avoid unnecessarily obscuring the described embodiments of the invention.

The present disclosure describes examples of hearing devices for enhancing the hearing ability, particularly in noisy conditions, while maintaining reliable biosensing of vital signs. One embodiment of the present disclosure, as shown in FIGS. 4-12, comprises a hearing device 40 placed in front of the ear 20, thus referred to herein as FTE hearing device. The main electronic module 41 of the FTE device 40 may be placed approximately at the condyle area in proximity to the superficial temporal artery 28 and it branches 29. The FTE device 40 is secured to the ear using a posterior portion 43 extending over the ear 20. The posterior portion 43 may be "C" shaped to aid in securing the FTE hearing device to the ear. The FTE device 40 comprises a speaker section 48 configured for providing sound into the ear cavity and further securing the FTE device 40 to the ear 20. In one embodiment, one or more biosensors 42 are placed within the main electronic module 41 proximal to the superficial temporal artery system 28 & 29. The biosensors 42 incorporated in biosensor hub 50 provided within the FTE device 40 are configured to non-invasively detect one or more vital signs. For example, a combination of photodiodes 51 and infra-red LEDs 52 (FIG. 11) for detecting heart rate through blood flow fluctuations at the superficial temporal artery 28 region. In some embodiments, the sensors 42 are configured for direct or close skin contact to provide continuous reliable sensing of vital signs.

Figure 6:
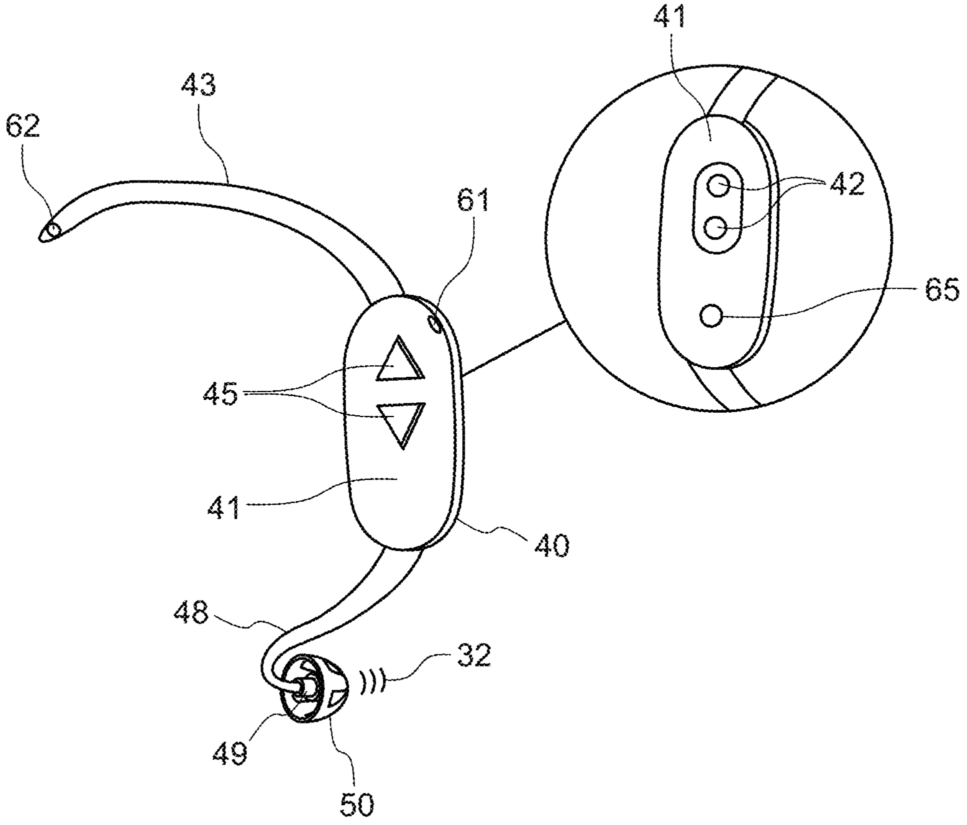
FIG. 6 is a more detailed view of the hearing device of FIG. 5 showing front and rear microphones, biosensors on the back side of the main module, according to some examples.
Figure 10:
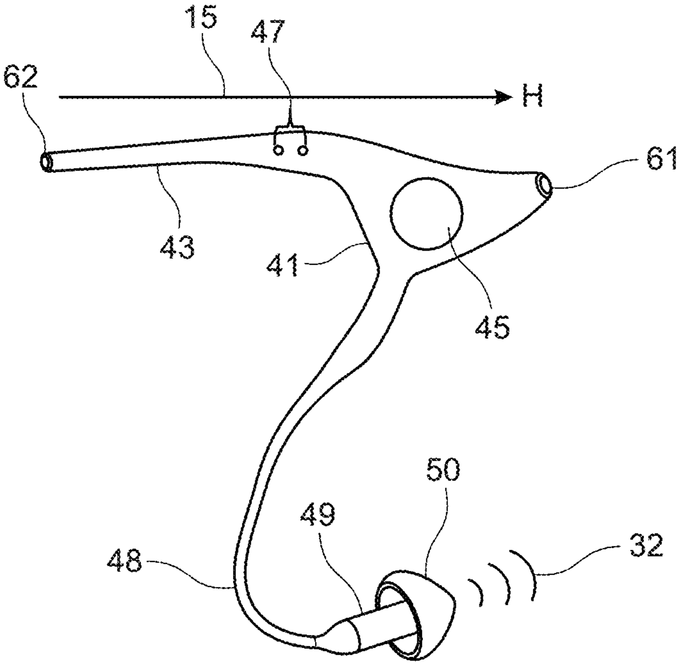
FIG. 10 is a view of the front of the ear hearing device showing main module and front and rear microphones aligned substantially in the horizontal direction, and a closed-fit ear tip, according to an alternate example.

In preferred embodiments, the speaker section 48 extends downward from the main module 41 and comprises a speaker 49 (sometimes referred to as receiver) for placement into the ear cavity behind the tragus 21 to deliver sound 32 directly to the ear cavity. In the preferred embodiments, the speaker section 48 is configured for fitting and concealing within the upper or lower notches of the tragus 21. An ear tip 50 may be provided at the receiver 49 to secure the FTE hearing device 40 to the ear 20. The ear tip 50 may be an open-fit type as shown in FIG. 6 by comprising large openings (vented ear tip) or closed-fit type as shown in FIG. 10 for providing acoustic sealing in the ear cavity. The ear tip 50 is preferably made of soft and compliant material such Silicone® or medical grade rubber and offered in assorted types and sizes to fit individual ears. Ear tip 50 may be configured for placement into the concha bowl behind the tragus 21 (FIG. 4) or deeper inside the ear canal. Placement of the speaker 49 in the ear cavity provides efficient sound delivery while significantly reducing feedback when the FTE hearing device is configured for providing significant level of sound amplifications. For example, a closed-fit seal tip may be suitable for acoustic gains higher than 30 decibels. In another example, an open-fit tip may be preferred for receiving natural sounds concurrently with sounds 32 delivered by receiver 49. In other applications, ambient noise cancellation may be achieved by a closed-fit ear tip, or electronically by a noise cancellation algorithm provided by the electronics of the FTE hearing device 40.

Various electronic components, sensors, transducers and power sources (battery) may be incorporated in the main module 41 or the posterior portion 43, for implementing the form and function as disclosed in the example embodiments of the present disclosure.

In an embodiment, biosensors 42 are configured for placement generally at the condyle area 27, in proximity to superficial temporal artery 28 and the adjacent superficial temporal vain, for sensing one or more vital signs. In an example implementation shown in the simplified block diagram of FIG. 11, a biosensor hub 50 incorporating optical sensors comprised of photodiodes 51 (PD1 & PD2) and light emitting diodes 52 (LED1 & LED2) for sensing photoplethysmogram (PPG) activities caused by volumetric changes in the microvascular tissues near the superficial temporal artery 26. PPG measurements may be performed in conjunction with integrated circuitry embedded in the FTE hearing device 40, including LED driver 58, current analog to digital converter (CADC) 53, current controller 54, a microcontroller unit (MCU) 55 and memory 56 for storing operational code and algorithms dedicated to vital sign signal detection. In a preferred embodiment, heart rate (HR) and oxygen saturation (SpO2) are detected by the biosensor hub 50. An example of biosensor hub 50 is MAXM86146 manufactured by Analog Devices, Inc, comprising an optical biosensing analog front end (AFE), an ARM® microcontroller and two photodiodes. In another embodiment, a motion sensor element 57, such as 3-axis accelerometer IC KIONIX KX122 manufactured by ROHM Co., Ltd, is incorporated to detect head position and motion for a person wearing the FTE hearing device 40. In some embodiments, the motion sensor is configured for detecting any of motion, position, activity, or a combination thereof of the user.

Figure 7:
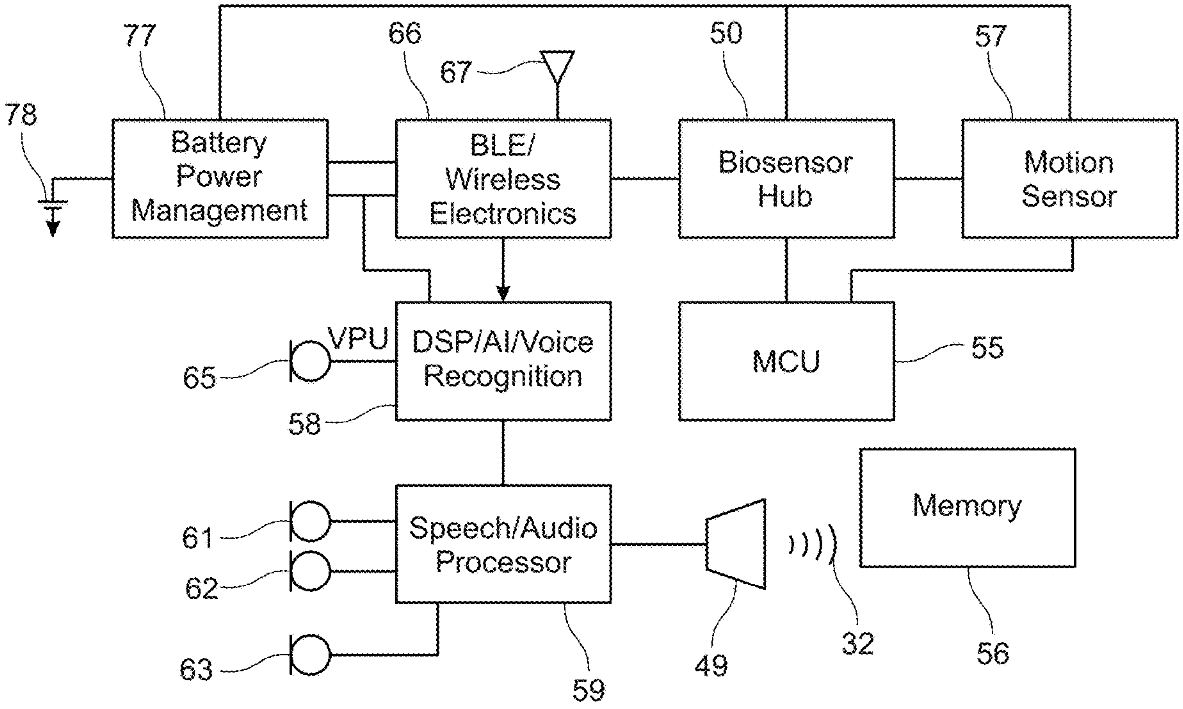
FIG. 7 is a high-level block diaphragm of major electronic and sensor systems embedded in the hearing device, according to some examples.
Figure 11:
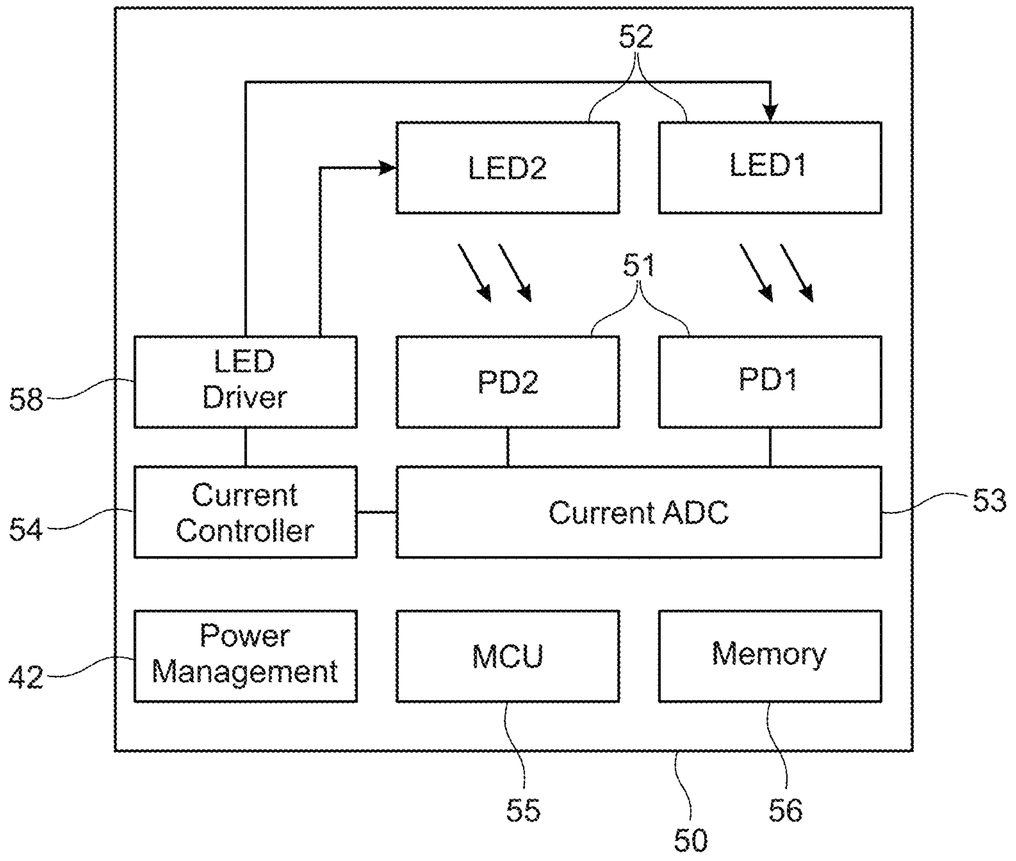
FIG. 11 is a simplified block diagram of a biosensor hub embedded in the hearing device for placement near the superficial temporal artery area, according to some examples.
Figure 12:
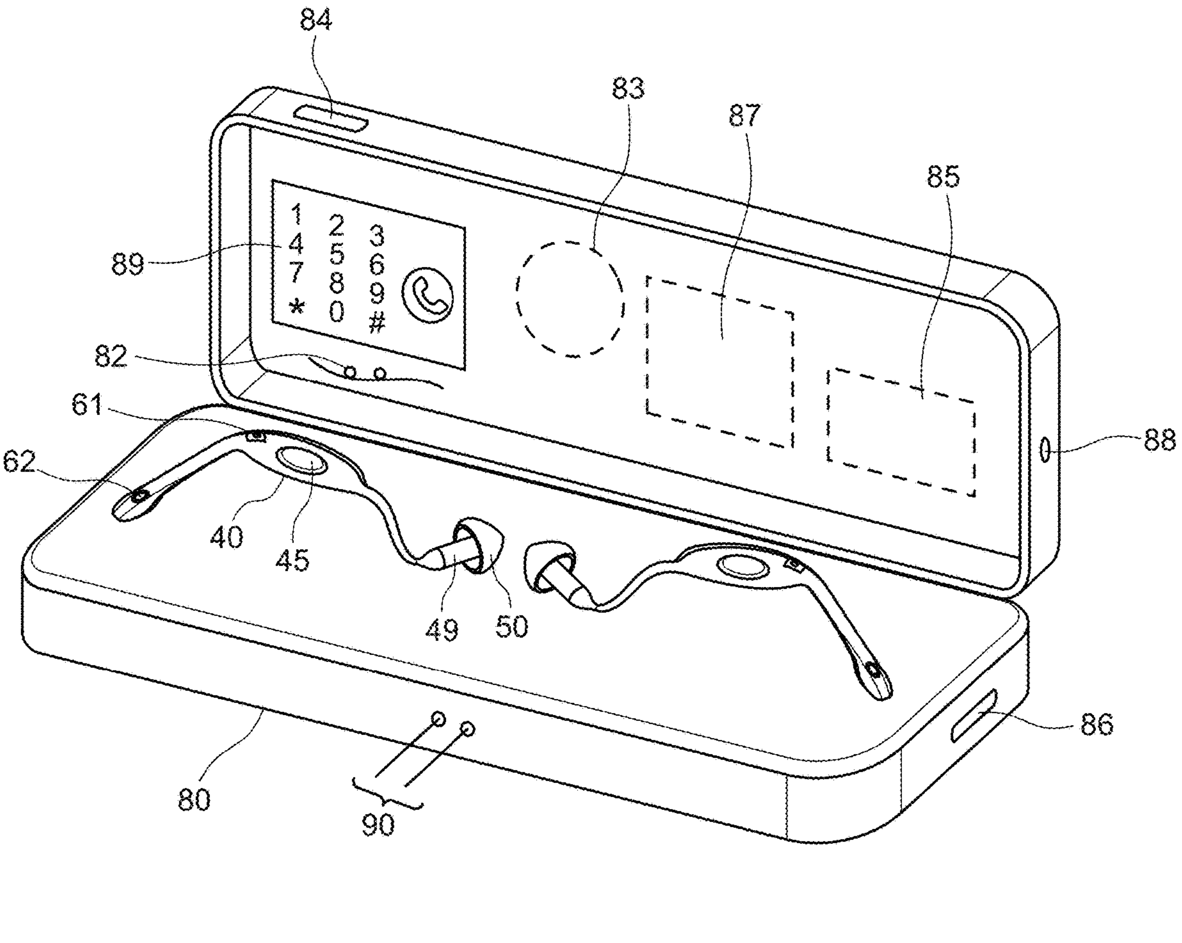
FIG. 12 is a view of a charging case configured as a telephony device, according to some examples.

In some embodiments shown in FIGS. 5-12, the FTE hearing device 40 comprises multiple processors, each dedicated for specialized functions as shown in FIGS. 7 & 11. For example, MCU 55 for detecting vital sign signals and motion sensing, a digital signal processor (DSP) 58 for voice recognition and artificial intelligence functions, and an audio processor 59 for processing speech and audio signals picked up the array of microphones 61-63 provided within the FTE hearing device 40.

Figure 8:
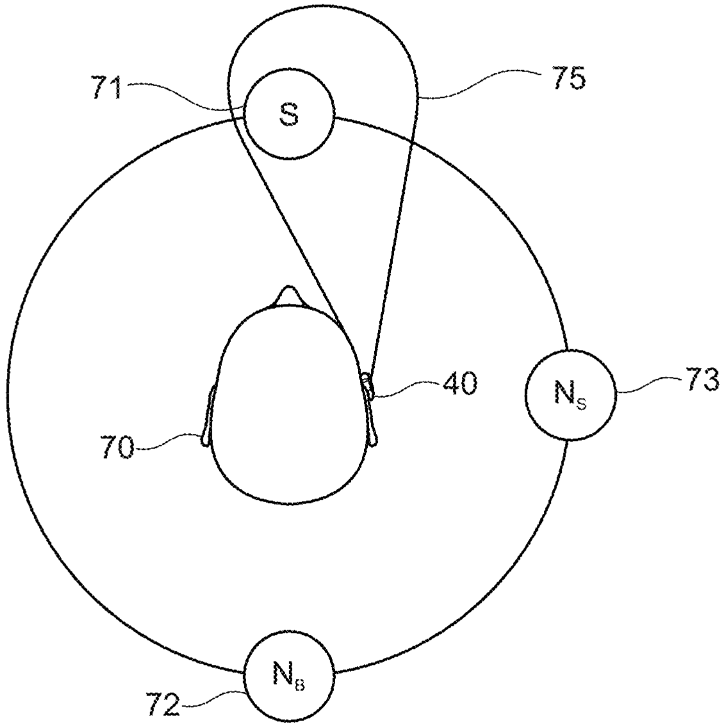
FIG. 8 is a diagram showing sound directionality, according to some examples.
Figure 9:
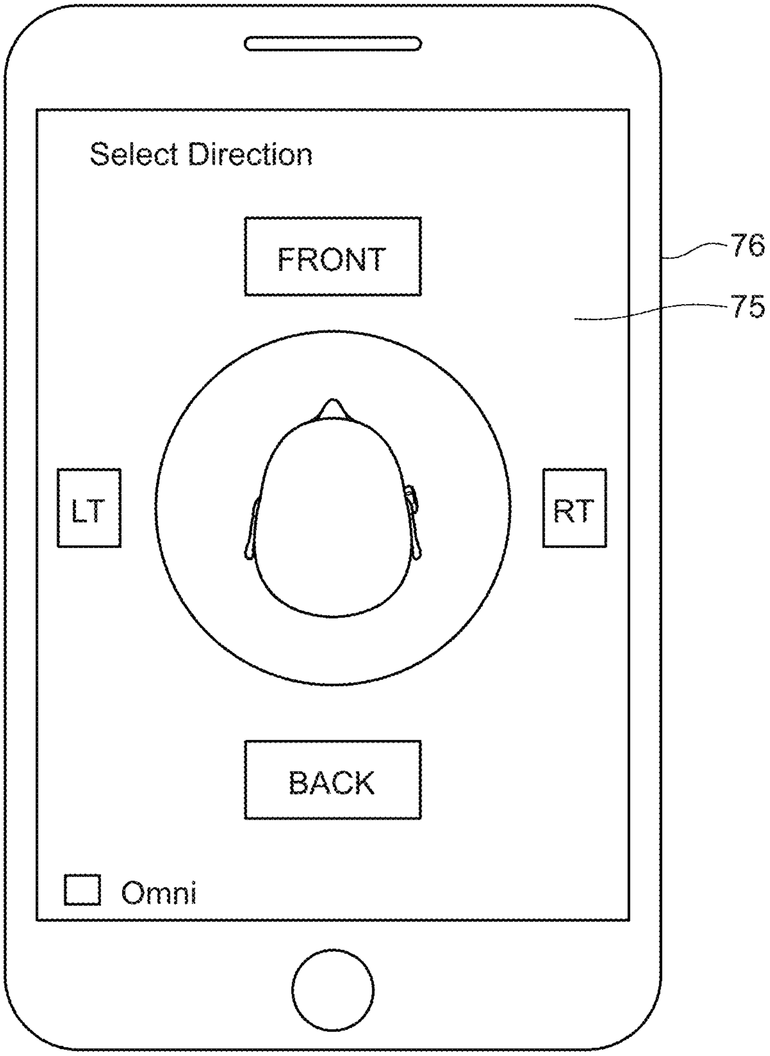
FIG. 9 is a view of an APP screen for a smartphone communicatively coupled to the hearing device, allowing the user to select the directionality, according to some examples.

In another embodiment, multiple microphones are provided for achieving highly directional hearing ability. Directionality is particularly important for improving speech perception in certain situations. For example, the wearer can turn their head in the direction of interest to enhance speech perception in a noisy environment such as a restaurant. The directional enhancement is achieved by aligning a front microphone 61 and a rear microphone 62 generally along the horizontal direction 15 with a substantial distance between the two microphones. This arrangement enables for suppression of competing sounds, in conjunction with an algorithm executed by audio processor 59. In one embodiment, voice pick up (VPU) microphone 65 is provided in the main module to pick up skull vibrations created by the person wearing the FTE hearing device 40 when talking. The VPU is sometimes referred to as vibration sensor. The microphone array 61-63, in conjunction with audio processor 59 and directionality algorithms, are employed to improve signal to noise (S/N) ratio as shown in FIG. 8. The subject of interest(S) 71 is generally at the front direction with respect to the head as shown relative to backside noise ($N_B$) 72 and side noise ($N_S$) 73. Various sensitivity and directionality patterns maybe achieved by microphone arrangements and algorithms, including hyper-cardioid, super-cardioid, and shotgun" pattern 75 as shown in FIG. 8 which exhibits a sharp pick-up at the front relative to other directions. Although frontal directionality is generally desirable, particularly for hearing-impaired persons with compromised speech recognition ability, alternate directionalities may be desired in other circumstances. In an example embodiment, an application (APP) 75 is provided by a smartphone 76 communicatively coupled to the FTE hearing device 40 for the user to select a desired directionality of sound pickup. This may include omnidirectional, front, side, or back choices, as shown in FIG. 9. The sensitivity or pattern of directionality may also be selected by the FTE device 40 user from APP.

A voice pick-up (VPU) microphone 65, in conjunction with algorithms, may be provided to enhance self-voice, or to cancel it, depending on the application. Self-voice enhancement may be applied for voice commands, voice authentication applications, while self-voice cancellation may be applied for hands-free phone calls and for hearing aid applications, according to some examples. It should be understood that other microphone arrangements may be provided to achieve desired audibility and directionality. In preferred embodiments, Signal to Noise (S/N) ratio improvement of 6 dB or higher is desirable in the example embodiments. The high directionality achieved by the FTE hearing device 40 as described herein is partially achieved by the relatively large distance between a front microphone 61 and a rear microphone 62, compared to conventional hearing aids (i.e., BTE and RIC hearing aids), whereby two microphones are arranged at relatively close distance and at substantial vertical orientation, limiting the S/N improvement to about 3 dB as known in the field of hearing aids. In the preferred embodiments, the distance between the two microphones, or the microphone ports thereof, is at least 3 cm.

In some embodiments, an additional speaker or vibrator may be employed to enhance the functionality such as improving the frequency response. The FTE hearing device 40 may comprise electronic components including wireless electronics 66 and wireless antenna 67 for wireless communications with a smartphone or other wireless devices in proximity. In some examples, the wireless antenna 67 may be a chip antenna, for example a ceramic chip antenna. In some embodiments, the wireless antenna 67 may be communicatively coupled to wireless electronics 66 of the eyeglass hearing device 40. The wireless electronics 66 may include functionality to transmit and receive wireless signals. The wireless electronics 66 may utilize standardized protocols, such as Bluetooth, near-field magnetic induction, Wi-Fi, Zigbee or any other known wireless protocol. In some examples, the wireless electronics 66 include low power and low energy functionalities compatible with miniature button cell or coin cell batteries that are commonly used for hearing aids and miniature electronic devices. Bluetooth, including Low Energy (LE) versions, is particularly suited.

In some embodiments, the FTE hearing device 40 further comprises one or more biosensors 42 for detecting one or more vital signs such as, any one or more of a heart rate, oxygen saturation level, glucose level, blood pressure, respiration rate and temperature of the user wearing the FTE hearing device 40. Other vital signs and activity sensing are well within the scope of the present disclosure utilizing the anatomical advantage along the path of superficial temporal artery in front of the ear. The medially oriented receiver portion 48 (interchangeably also called as speaker section 48) delivers sound directly into the ear cavity while securing the FTE hearing device 40 to the ear. Secure placement enables reliable long-term vital sign monitoring, even during exercise and vigorous activities.

In some embodiments, the FTE hearing device 40 is wirelessly coupled to a smartphone for variety of applications including relaying to and displaying biosensor data from biosensors 42 and activity sensor 57, for receiving audio streaming for music listening, and for telephony communications. In preferred embodiments, bidirectional wireless audio streaming is provided for hand-free telephony communications via a smartphone paired to the FTE hearing device 40. In other embodiments, telephony communications may be embedded in the FTE hearing device 40 for connecting to a wireless network or directly to a cellular network.

The selection for a particular mode of operation or a communication mode may be achieved via on-board switch 45 (i.e., buttons) provided on the main electronic module 41, or via wireless commands from a smartphone APP paired to the FTE hearing device 40. Buttons 45 may be manual for activation by finger, or contactless type such as a capacitive or optical switch, or by gesture sensing via the on-board motion sensor 57. Biological and physical activity data sensed by the FTE hearing device 40 may be transferred to a smartphone, a remote wireless device, or a remote service via the Internet.

In further embodiments, the FTE hearing device 40 enhances live sound picked up by microphones, or audio signals streamed by a wireless device such as smartphone, TV, car radio, music player, etc., via Bluetooth for example. In another embodiment, the user can select the mode of operation, such as directionality of sound, wireless audio streaming or telephony communication, among examples that will become obvious to those skilled in the art of wearables and communications. This selection can be made from on-board switches 45, a smartphone APP, or by voice activation. The FTE hearing device 40 may be configured to respond to voice commands, and subsequently enable or control other devices including a smartphone or electronic appliances in proximity. In other embodiments, the FTE hearing device 40 may be configured as a digital assistant when connected to a network. For example, configuring the FTE hearing device 40 as an Alexa-enabling device when connected via WIFI or Bluetooth® to a wireless network. In other examples, voice command may increase the volume, initiate or pick up phone calls. Text-to-speech and AI generated voice may be incorporated.

Motion-related sensors (i.e., accelerometer, gyroscope) maybe be utilized to monitor the position, activity (or inactivity) of the wearer. For example, sleeping, walking, exercise or for detecting a fall and alerting others about such an adverse event via a wireless network. In a preferred embodiment, the FTE hearing device 40 is configured as a telephony device, for receiving and initiating phone calls. In further embodiments, the FTE hearing device 40 comprises multiple processors including an audio processor 59, AI processor 58, and a general-purpose processor (MCU) 55. In some embodiments, the FTE hearing device 40 further comprises power management circuitry 77 and one or more rechargeable batteries 78.

The FTE hearing device 40 may be chargeable by electrical charge contacts 47 (FIG. 11) provided on the exterior surface, a charging port such as micro-USB port (not shown), or via wireless charging via an inductive coil (not shown) embedded in the main electronic module 41. In one embodiment, a charging case 80 (FIG. 12) may be provided to store the FTE hearing device 40 and charge it via case charging contacts 82 during storage. The charging may also be wireless with charging inductive coils 83 embedded in the charging case 80. The charging case may comprise a charging port 86 for charging a rechargeable battery 85 within for providing several charge cycles for the FTE hearing device 40. In one embodiment, the charging case 80 comprises telephony hardware 87, a touch screen 89 for control and for displaying a dial pad and enabling telephony communications. Hands-free telephony communications may be enabled by the combination of the FTE hearing device 40 and telephony charging case 80. The charge case may comprise large memory for storing applications, audio, and video files for streaming to the FTE hearing device 40 on demand. Voice commands, such as "call office" may be picked up by the voice detection feature of the FTE hearing device 40 initiating a wireless command to the charging case 80 or to a smart phone. Subsequently initiating a call via a cellular network. In other embodiments, the charging case 80 may be configured as a smartphone by incorporating a microphone 88 and a speaker 84.

The disclosed embodiments may combine wireless connectivity, cloud-based services, artificial intelligence (AI) and machine learning (ML), enabling advanced communications, health, and safety monitoring for a person wearing the FTE hearing device 40. Functions enabled include but not limited to voice detection, voice authentication, speaker isolation, audio recording, language translation, acoustic scene detection for automatic adjustment of hearing enhancement parameters, vital sign monitoring, deep noise cancellation, and stress monitoring among other features which will become obvious to those skilled in the art. For example, the FTE hearing device 40 may be configured, or trained by ML to detect specific sounds, such as a crying baby, or detect certain spoken words, convert text messages and other information to audible messages for delivery via the speaker 49. The detection mode maybe be always-on, or on demand. In other embodiments, a camera (not shown) may be incorporated in the main electronic module 41. It should be understood that the FTE hearing device 40 may be provided in a singular configuration (monaural for one ear), or binaurally for right and left ears.

Although examples of the invention have been described herein, it will be recognized by those skilled in the art to which the invention pertains from a consideration of the foregoing description of presently preferred and alternate embodiments and methods of fabrication and use thereof, and that variations and modifications of this exemplary embodiment and method may be made without departing from the true spirit and scope of the invention. Thus, the above-described embodiments of the invention should not be viewed as exhaustive or as limiting the invention to the precise configurations or techniques disclosed. Rather, it is intended that the invention shall be limited only by the appended claims and the rules and principles of applicable law.

What is claimed is:

1. A front of the ear hearing device comprising:

a main electronic module configured for placement in front of an ear of a user at the superficial temporal artery area of a head of the user, the main electronic module comprising a first microphone configured as a front microphone aligned substantially in a horizontal orientation with respect to a second microphone to improve directionality of a frontal sound pick up;

a speaker section medially oriented and configured to deliver sound into an ear cavity of the ear of the user and secure the hearing device therein; and a posterior portion extending over the ear to further secure the hearing device to the head.

2. The front of the ear hearing device of claim 1, wherein the main electronic module further comprises one or more biosensors configured for detecting one or more vital signs in the vicinity of the superficial temporal artery of the user.

3. The front of the ear hearing device of claim 2, wherein the one or more vital signs comprise one or more of heart rate, oxygen level, glucose level, respiration rate, temperature, and blood pressure.

4. The front of the ear hearing device of claim 2, wherein the one or more biosensors comprise at least one of a photodiode and a light emitting diode (LED).

5. The front of the ear hearing device of claim 1, wherein the device further comprises a motion sensor for detecting at least one of motion, position, and activity of the user.

6. The front of the ear hearing device of claim 1, wherein the device further comprises a vibration sensor for sensing self-voice of the user.

7. The front of the ear hearing device of claim 1, wherein the device is further configured for any of hearing enhancement, wireless communications with a smartphone, telephony communications, audio streaming, and digital assistance.

8. The front of the ear hearing device of claim 1, wherein the device is further configured for at least one of voice commands, voice recognition, speech recognition, language translation, noise cancellation, and text-to-speech conversion.

9. The front of the ear hearing device of claim 1, wherein the device further comprises at least one of an audio processor, an artificial intelligence (AI) processor, a biosensor processor, and a general purpose processor.

10. The front of the ear hearing device of claim 1, wherein the device further comprises one or more switches.

11. A hearing device comprising:

a main electronic module configured for placement in front of an ear of a user, in proximity to the superficial temporal artery of the user, wherein the main electronic module comprises one or more biosensors for detecting one or more vital signs of the user in vicinity of the superficial temporal artery;

a speaker section extending from the main electronic module and configured to deliver sound into the ear of the user; and a posterior portion extending from the main electronic module to over the ear of the user for securing the hearing device to the ear of the user.

12. The hearing device of claim 11, wherein the hearing device is configured for at least one of hearing enhancement, wireless communications with a smartphone, wireless audio streaming, and telephony communications.

13. The hearing device of claim 11, wherein the vital sign is at least one of heart rate, oxygen level, glucose level, temperature, respiration rate, and blood pressure.

14. The hearing device of claim 11, wherein the hearing device further comprises at least one of a motion sensor and a vibration sensor.

15. A wireless communication system comprising:

a hearing device comprising a main module configured for placement generally at the superficial temporal artery area in front of an ear of a user, the main module comprising an audio processor, wireless electronics for communicating with wireless devices in proximity, and a speaker section configured for placement of a speaker into the ear of the user;

a posterior portion extending over the ear for securing the hearing device to the ear; and a telephony device configured for wireless communications with the hearing device.

16. The wireless communication system of claim 15, wherein the hearing device is configured as at least one of a hearing enhancement device and a digital assistance device.

17. The wireless communication system of claim 15, wherein the hearing device further comprises one or more biosensors provided in proximity to the superficial temporal artery for sensing one or more vital signs.

18. The wireless communication system of claim 17, wherein the one or more vital signs comprise at least one of heart rate, oxygen level, temperature, glucose level, respiration rate, and blood pressure.

19. The wireless communication system of claim 15, wherein the telephony device is a smartphone.

20. The wireless communication system of claim 15, wherein the telephony device is configured as a charging case for charging the hearing device.

* * * * *